C. & F. SWOBODA.
CAR FENDER.
APPLICATION FILED MAR. 28, 1916.
1,187,022.
Patented June 13, 1916.
2 SHEETS—SHEET 1.
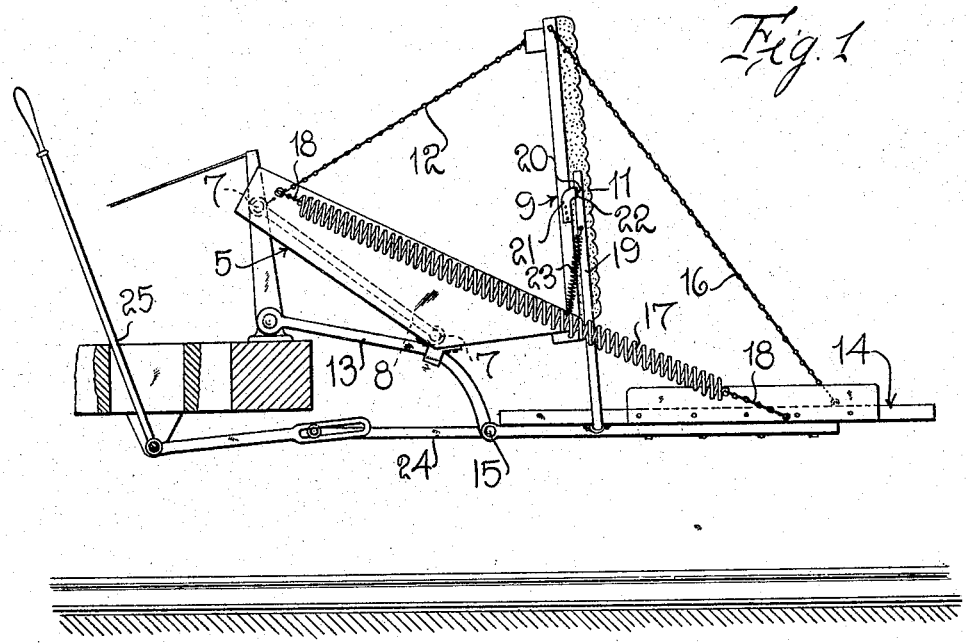
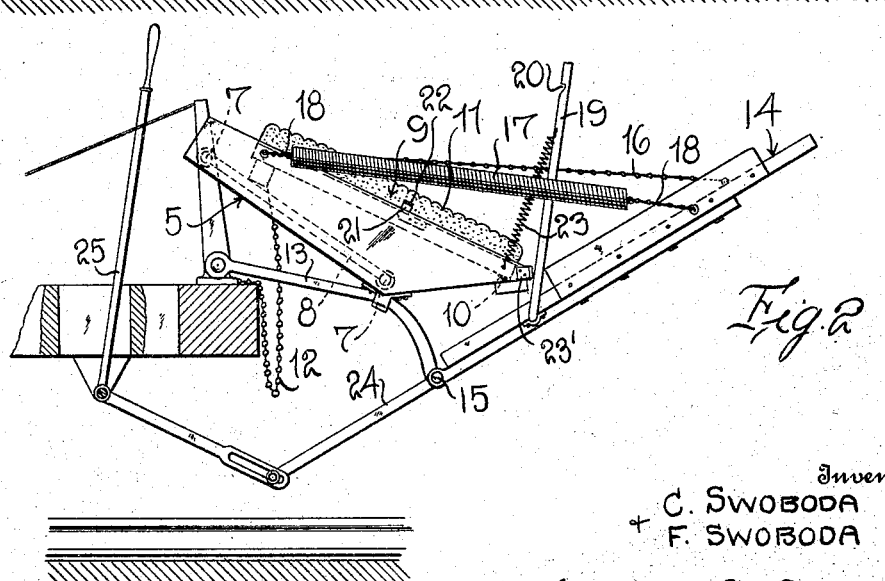
Inventors
C. SWOBODA
F. SWOBODA
By Watson E. Coleman
Attorney

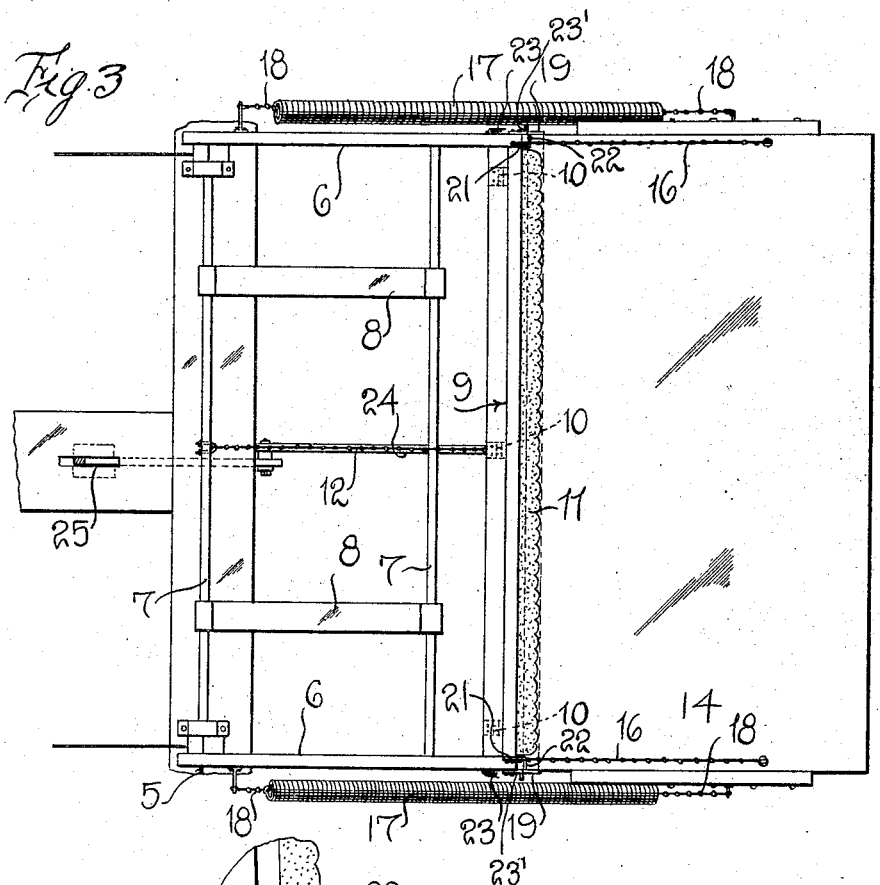
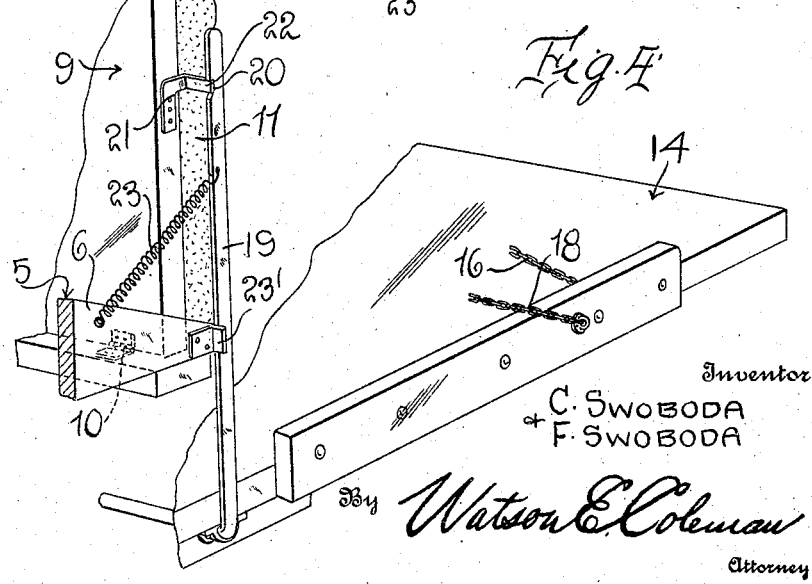

UNITED STATES PATENT OFFICE.

CARL SWOBODA AND FRED SWOBODA, OF BOLIVAR, MISSOURI.

CAR-FENDER.

1,187,022.  Specification of Letters Patent.  Patented June 13, 1916.

Application filed March 28, 1916. Serial No. 87,254.

*To all whom it may concern:*

Be it known that we, CARL SWOBODA and FRED SWOBODA, citizens of the United States, residing at Bolivar, in the county of Polk and State of Missouri, have invented certain new and useful Improvements in Car-Fenders, of which the following is a specification, reference being had to the accompanying drawings.

This invention relates to an improved car fender and has for its primary object to provide a simply constructed device which will be automatically actuated by the impact of a body falling thereon to elevate the body and obviate possibility of the same rolling under the car wheels.

It is another and more particular object of the invention to provide a fender body mounted upon the car, an impact receiving member pivotally mounted upon the body, a pivotally mounted platform extending forwardly of the body, means operatively connected to said platform to elevate the forward end thereof, and latch mechanism to hold the platform and the impact receiving member in their normal set positions.

It is a still further object of our invention to generally improve and simplify the construction of car fenders whereby the same are rendered reliable and efficient in practical operation and not liable to get out of order, and capable of manufacture at relatively small cost.

With the above and other objects in view, our invention consists in the novel features of construction, combination and arrangement of parts to be hereinafter more fully described, claimed and illustrated in the accompanying drawing, in which, Figure 1 is a side elevation of a car fender constructed in accordance with the preferred embodiment of our invention, and showing the parts in their normal set positions; Fig. 2 is a similar view illustrating the relative positions of the parts after the fender has operated to lift a body from the track; Fig. 3 is a top plan view; and Fig. 4 is a fragmentary perspective view illustrating the latch device for holding the impact receiving member and the platform in their operative positions.

Referring in detail to the drawings, 5 designates the body or frame of the fender which includes the obliquely inclined side bars connected at their upper and lower ends by the cross bars 7. Between the sides of this body frame, spaced, parallel slats or rails 8 connect the transverse rails 7 to each other. This frame is suitably mounted upon the forward end of the car. Between the lower ends of the side bars 6 of the frame, a rectangular impact receiving member 9 is pivotally mounted, as indicated at 10. Upon the front face of this member 10, a suitable cushion 11 is secured. A chain 12 is attached at one of its ends to the free end of the member 9 and at its other end to the upper transverse bar 7 of the frame. Supporting rods or bars 13 are rigidly fixed at their rear ends to the under side of the car body and at their forward ends are curved downwardly, as shown.

14 designates a platform which is provided adjacent its opposite edges with the pivot bolts 15 which are loosely mounted in the forward ends of the rods 13. This platform projects for a considerable distance in advance of the frame 5 as shown. While we have indicated a platform construction which we have found to be very satisfactory in practical use, it is to be understood that the same may be of any desired form and that the detail features thereof may be variously modified. The forward end of this platform, at its opposite side edges, is connected by the chains 16 to the free end of the impact receiving member 9. Strong contractile springs 17 have their opposite ends connected by means of the chains 18 to the side bars 6 of the frame and to the forward end of the platform 14 respectively.

In suitable bearings on the under side of the platform 14, at its rear end, a U-shaped latch rod 19 is rotatably mounted. The parallel end portions of this rod project upwardly from the opposite side edges of the platform 14 and each of said arms, adjacent its extremity, has a notch 20 in its rear edge. To the side edges of the impact receiving member 9, plates 21 are fixed, said plates being formed upon one of their ends with the outwardly projecting lugs 22 adapted to be engaged in the notches 20 of the arms of the rod 18. Contractile springs 23 are connected to the ends of the rod 19 at one of their ends and have their other ends fixed to the sides of the frame 5. These springs normally act to hold the arms of said rod against the outwardly projecting stops 24 on the lower forward end of the frame 5.

When the fender is set in condition for use, the platform 14 is forced downwardly to the position shown in Fig. 1, and the impact receiving member 9 is raised from between the sides 6 of the frame to a substantially vertical position. The lugs 18 are engaged in the notches 20 in the ends of the rod 19, whereby the platform is held in its lowered position against the contractile action of the springs 17. When the body strikes upon the cushion 11, the member 9 is forced rearwardly and downwardly, thus disengaging the lugs 18 from the ends of the rod 19, whereupon the springs 17 will act to pull the forward end of the platform 14 upwardly to the position shown in Fig. 2 of the drawings, and thus elevate the body so that the same will not roll off of the platform beneath the wheels of the car.

To the under side of the platform 14, a rearwardly extending rod 24 is secured, and to the rear end of said rod a lever 25 is operatively connected. By means of this lever, the platform may be returned to its normal set position, as will be readily understood from an examination of the drawings. The ends of the rod 19 bearing against the stops 23 on the frame 5, cause the ends of the rod to be pushed or forced forwardly when the platform is lifted by the springs 17 to its elevated position, whereby the springs 22 are expanded and placed under tension. When the platform is again lowered to its former position, said springs contract and again engage the ends of the latch rod with the lugs 20 on the side edges of the member 9, it being understood that this member is lifted to its upright position by the chains 16 which connect the same to the forward end of the platform 14.

From the foregoing description, taken in connection with the accompanying drawing, the construction, manner of operation and several advantages of our invention will be clearly and fully understood. It will be seen that we have produced a very simple and durably constructed fender which is positive in its operation and will act automatically when a body falls thereon to support the body and obviate all possibility of the same rolling from the fender under the car wheels. The device may be readily applied to the ordinary street car and without necessitating any material alterations in the construction thereof.

While we have shown and described the preferred construction and arrangement of the several elements, it is to be understood that the device is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is:—

1. A street car fender including a fixed frame, an impact receiving member pivotally mounted in said frame, a pivoted platform projecting forwardly of the frame, latch means to retain said impact receiving member and the platform in their normal set positions against relative movement, and means connected to the forward end of the platform to elevate the same upon the impact of a body against said member.

2. A car fender including a fixed frame, an impact receiving member pivotally mounted in said frame, a pivoted platform extending forwardly of the frame, coil springs connected to the forward end of the platform and acting to elevate the same, and latch elements on the impact receiving member and the platform adapted to be coöperatively engaged to sustain said parts in their set positions against the action of said springs.

3. A car fender including a frame, an impact receiving member pivotally mounted in the frame, a pivotally mounted platform extending forwardly of the frame, springs connected to the forward end of said platform and acting to elevate the same, a latch rod mounted upon the platform, a keeper lug fixed to said impact receiving member for coöperative engagement with said latch rod to retain said member and the platform in their set positions, said lug being released from engagement with the rod by the impact of a body against said member, and manually operable means for returning the platform and the impact receiving member to their normal set positions.

4. A car fender including a fixed frame, an impact receiving member pivotally mounted in said frame, a pivoted platform extending forwardly of the frame, a rod rotatably mounted upon the platform and having angularly disposed arms each provided with a notch, keeper lugs on the opposite edges of the impact receiving member for engagement in the notches of the respective arms to sustain the platform and the impact receiving member in their set positions, stops for engagement by said arms, springs connected to the arms to hold the same in engagement with said stops, and springs connected to the forward end of the platform to elevate the same when the lugs are disengaged from said notches upon the impact of a body against said pivoted platform.

5. A car fender including a fixed frame, an impact receiving member pivotally mounted in said frame, a pivoted platform extending forwardly of the frame, a rod rotatably mounted upon the platform and having angularly disposed arms each provided with a notch, keeper lugs on the opposite edges of the impact receiving member for engagement in the notches of the respective arms to sustain the platform and the impact receiving member in their set positions, stops for engagement by said arms, springs connected to the arms to hold the same in engagement with said stops, springs connected to the forward end of the platform to elevate the same when the lugs are disengaged from said notches upon the impact of a body against said pivoted platform, flexible connections between the forward end of said platform and the impact receiving member, and manually operable means connected to the platform to return the same and the impact receiving member to their normal operative positions.

In testimony whereof we hereunto affix our signatures in the presence of two witnesses.

CARL SWOBODA.
FRED SWOBODA.

Witnesses:
JOHN SITTA,
DAN M. BAILEY.

Copies of this patent may be obtained for five cents each, by addressing the "Commissioner of Patents, Washington, D. C."